United States Patent [19]

Backlund

[11] 3,895,117

[45] July 15, 1975

[54] ANIMAL FEED SUPPLEMENT AND METHOD FOR ITS PREPARATION

[75] Inventor: Peter Stanley Backlund, Anaheim, Calif.

[73] Assignee: Union Oil Company of California, Brea, Calif.

[22] Filed: July 5, 1973

[21] Appl. No.: 376,706

Related U.S. Application Data

[63] Continuation-in-part of Ser. No. 182,267, Sept. 20, 1971, abandoned.

[52] U.S. Cl. ............... 426/69; 426/201; 426/213; 426/519; 426/218; 426/363; 426/807
[51] Int. Cl. ............................................. A23k 1/22
[58] Field of Search ........... 426/213, 380, 363, 362, 426/807, 69, 201, 218, 519

[56] References Cited
UNITED STATES PATENTS

| | | | |
|---|---|---|---|
| 2,321,400 | 6/1943 | Lubarsky | 99/6 X |
| 2,472,663 | 6/1949 | Kleine | 99/2 I |
| 2,793,952 | 5/1957 | Rawlings | 99/6 |
| 2,807,546 | 9/1957 | Anderson | 99/6 |
| 2,851,357 | 9/1958 | Bedford | 99/6 X |
| 3,093,485 | 6/1963 | Partyka | 99/139 X |
| 3,420,672 | 1/1969 | Appleman | 99/6 |
| 3,600,187 | 8/1971 | Elenbogen | 99/2 I |

*Primary Examiner*—John Adee
*Assistant Examiner*—Ernest G. Therkorn
*Attorney, Agent, or Firm*—Richard C. Hartman; Dean Sandford; Michael H. Laird

[57] ABSTRACT

There is disclosed an animal feed supplement which is an emulsion of solid fat in molasses with a surfactant to effect the emulsification and/or, preferably, a hydrocolloid to stabilize the emulsion. The major ingredient of the composition is molasses and the fat can be present in amounts from 15 to about 40 weight percent. Preferably, lesser amounts of urea, e.g., from about 5 to about 15 weight percent, are present to furnish the nitrogen requirements of the animal and a minor amount of phosphoric acid is employed to lower the pH of the composition and render it biologically stable. The method for the preparation of the feed supplement involves the steps consisting of heating the solid fat to a molten condition, adding an oil-in-water surfactant in the absence of water to form a preblend and then admixing the preblend with molasses to effect emulsification of the fat in the molasses and adding sufficient water to achieve a product having a viscosity no greater than about 3,000 centipoises at 70°F.

9 Claims, No Drawings

3,895,117

ANIMAL FEED SUPPLEMENT AND METHOD FOR ITS PREPARATION

DESCRIPTION OF THE INVENTION

This application is a continuation-in-part of my prior application, Ser. No. 182,267 filed Sept. 20, 1971, now abandoned. This invention relates to an animal feed supplement and, in particular, relates to an animal feed supplement containing solid fats emulsified in a predominantly molasses medium.

BACKGROUND OF THE INVENTION

It is known that molasses can be used as an animal feed supplement and, furthermore, it is known that molasses can be combined with other materials such as solid fats, urea and phosphoric acid to supplement the dietary requirements of animals. It is desirable to incorporate a large quantity of solid fat in such animal feed supplements since the fat is an excellent source of energy for the animal. Various patents have issued on these feed supplements including U.S. Pat. No. 2,793,952 which discloses a method for incorporating fat into an emulsion with molasses by forming an unstable aqueous emulsion of the fat which is then blended into the molasses.

Unfortunately, however, solid fat is difficult to emulsify with molasses and provide compositions which are stable liquids. While the method described in the aforesaid patent is satisfactory for relatively low fat content feed supplements, it has been found that the method does not produce an emulsified product containing greater than about 15 weight percent fat. It is desirable, however, to incorporate as much fat in these compositions as possible, up to the limit where the animals will reject the supplement. It has also been found that the compositions which are achieved by emulsification of fat in molasses using an oil-in-water surfactant are not entirely stable and tend to separate or settle upon extended storage. Accordingly, it is also desirable to provide improved emulsions which are stable for extended storage periods.

BRIEF STATEMENT OF THE INVENTION

It has now been found that fat can be emulsified in molasses to produce compositions containing greater than about 15 weight percent fat provided that the molten fat and an oil-in-water surfactant are first blended, in the absence of water, and the blend is then added to the molasses. The resulting blend is thoroughly stirred to achieve an intimate emulsification of the fat, and water can thereafter be added in the amount necessary to achieve the desired viscosity. If desired, the water can be premixed with the molasses rather than added to the blend of fat, surfactant and molasses.

It has been further found that the fat-containing feed supplements can be stabilized to permit an indefinite storage period or to permit frequent freeze-thaw cycling by incorporation of a minor amount, e.g., up to about 0.25 weight percent, of a hydrocolloid in the composition. This material can be used in lieu of or in addition to the aforementioned oil-in-water surfactant.

DISCLOSURE OF PREFERRED EMBODIMENTS

The fat which can be emulsified with the molasses in accordance with this invention comprises any fat which is solid at ambient conditions and which, preferably, has a melting point from about 100° to 185°F. Preferably, the fat is tallow which is produced by conventional rendering operations wherein the waste animal fat is heated to melt the fat and separate it from tissue and fibers. Included with such fat can also be minor amounts of solid fat such as hydrogenated oils, e.g., hydrogenated vegetable oils. Up to about 50 percent of the fat compositions can also comprise various fats which are liquid at ambient conditions, e.g., soy bean oil, cotton seed oil, corn oil, coconut oil, palm oil, etc. These fats, however, are more expensive than the tallow which is a waste product from the meat processing plants. Accordingly, the objective of this invention is to effect emulsification of the solid fats such as tallow and hydrogenated vegetable oils which are more plentiful and which are equally effective for supplying energy requirements of animals.

The molasses which serves as a carbohydrate source for the animal comprises the majority of the animal feed supplement and can be any commercial molasses. The molasses is commonly available as an aqueous solution which contains a sugar content from about 70 to about 85 Brix. Preferably, the composition is about 80 to about 85 Brix and contains about 15 to about 20 weight percent water. The molasses can be any of the sugar-containing molasses such as cane or blackstrap molasses, converted molasses, wood sugar molasses, hydryl syrup, citrus molasses, and the like. The cane or blackstrap molasses usually contains 55 percent or more sugars which are the important organic nutrients and carbohydrate source for the animal.

The emulsification of the solid fat in the molasses medium is accomplished by the addition of a pre-blended mixture of the molten fat and a minor amount of a surfactant to the molasses. Any suitable oil-in-water surface active agent can be employed in an amount comprising from 0.01 to about 0.5, preferably from about 0.05 to about 0.1, weight percent of the final feed supplement.

The surfactant can be of the cationic, anionic or nonionic types and the following paragraphs will describe suitable surfactants which can be employed. There is, in addition, a preferred class of surface active agents which are those surface active agents that have previously been recognized as safe for the inclusion in animal feed by the Environmental Protection Agency. Absence from this preferred class does not indicate that the agent is unsafe and therefore not useful; it merely indicates that registration for this use has not yet been obtained because a registration petition has not been filed or is still pending.

There are, however, a large number of other surfactants which are innocuous or harmless to animals and these include any of the cationic, anionic or nonionic types set forth in the following paragraphs.

Examples of the cationic surfactants include: fatty amines, e.g., dodecylamine, octadecylamine (Armeens, Duomeens of Armour Chemical Company); alkarylamines, e.g., dodecyl aniline, fatty amides such as fatty imidazolines, e.g., undecylimidazoline prepared by condensing lauric acid with ethylene diamine or oleyaminodiethylamine prepared by condensing the oleic acid with asymmetric diethylene diamine (Sapamine CH by Ciba); quaternary alkyl and aryl ammonium salts and hydrates, e.g., cetyltriethyl ammonium cetyl sulfate, dimethylbenzyldodecyl ammonium chloride, etc.; quaternary ammonium bases of fatty amides of disubstituted diamines, e.g., oleyl methylamino ethylene diethylamine methyl sulfate (Sapamine MS by Ciba), oleylbenzylamino ethylene diethylamine hydrochloride (Sapamine ECH by Ciba); fatty derivatives of benzimidazolines such as are prepared by condensation of a fatty acid with orthophenylenediamine followed by alkylation of the condensate with an alkyl halide to yield an N-alkyl alkylbenzimidazole, e.g., N-methyl N′N′diethyl heptadecylbenzimidazole; N-fatty alkyl pyridinium compounds, e.g., lauryl pyridinium, octadecyl pyridinium (Fixanol of Imperical Chemical Industries), octadecyl methylene pyridinium acetate, etc.

Examples of useful anionic surfactants include the following: fatty acid glyceride sulfonates and fatty acid sulfonates, e.g., sulfonated cottonseed oil, sulfonated oleic acid, sulfonated sperm oil, sulfonated tallow, etc.; sulfonated fatty amides, e.g., sulfonated amide of ricinoleic acid (Humectol CA by I.G. Farben), sodium salt of sulfuric ester of oleyl diisobutyl amide (Dismulgen V of I.G. Farben), etc.; sulfonated anilides of fats, e.g., sodium salt of sulfuric ester of oleyl ethyl anilide (Humectol CX by I.G. Farben), etc.; amides of aminosulfonic acids, e.g., sodium sulfonate of oleylmethyl tauride (Igepon T by I.G. Farben); amides from condensation of fatty acid chlorides with amino acids, e.g., sodium salt of oleyl sarcoside (Medialan A by I.G. Farben); sulfonated aromatic hydrocarbons, e.g., benzene sulfonic, naphthalene sulfonic acids and their ammonium and alkali metal salts, etc.; alkylaryl sulfonates, e.g., dodecylbenzene sulfonates, octadecylbenzene sulfonates, etc.

Illustrative nonionic compounds include the polyethylene oxide condensates with hydrophobic groups having a reactive hydrogen. The hydrophobic group can have from about 10 to 25 carbon atoms and from 2 to about 15 molecular weights of ethylene oxide are commonly condensed per molecular weights of hydrophobic group. The hydrophobic group can be selected from a variety of organic compounds having one or more reactive hydrogens including fatty alkyl or alkenyl alcohols, fatty acids, fatty amines, fatty amide, esterified hexitans or alkyl or alkenyl phenols.

As described, the source of the hydrophilic group is ethylene oxide. Other source materials can be employed, for example, ethylene chlorohydrin, or polyethylene glycol; however, because of its low cost and availability, ethylene oxide is used almost exclusively in the preparation of these materials.

The hydrophobic reactant can comprise an alkyl or alkenyl phenol wherein the alkyl or alkenyl group or groups contain between about two and about 16 carbon atoms. Among such compounds are the following: hexyl phenol, hexenyl phenol, hexadecyl phenol, dodecenyl phenols, tetradecyl phenol, heptenyl cresol, octyl and octenyl cresol, lauryl cresol, isoamyl cresol, decyl resorcinol, cetenyl resorcinol, idodecyl phenol, decenyl xylenol, etc. Examples of commercially available wetting agents belonging to this class and having a fatty acid constituent and containing ethylene oxide are the following: "Ninosol 100," "Ninosol 200," and "Ninosol 210" of the Alrose Chemical Company, and "Nopalcol 4-D" of the Nopco Chemical Company.

A third class of hydrophobic reactants comprises the alkyl and alkenyl alcohols containing between about eight and about 22 carbon atoms. Among such alcohols are doecanol, tridecanol, tetradecanol, pentadecanol, hexadecanol, heptadecanol, octadecenol, decosenol, etc. A commercially available wetting agent of this type and containing ethylene oxide is Brij 30 of The Atlas Powder Company.

A fourth class of the hydrophobic reactants comprises long chain alkyl or alkenyl amines or amides containing between about eight and about 22 carbon atoms. These compounds contain two reactive hydrogens and the polyethylene oxide units are distributed therebetween. Examples of such compounds are dodecanamide, tridecylamine, tetradecenamide, pentenyl amine, hexadecyl amine, heptadecanamide, octadecyl amine, oleic amide, etc. Examples of commercially available wetting agents in this group containing ethylene oxide are "Ethomide" of The Armour Chemical Company and "Priminox 10" of the Rohm and Haas Chemical Company.

Another class of surfactants are the reaction products of ethylene oxide with fatty acid partial esters of hexitans. Such compounds are obtained by treating a hexitol, e.g., sorbitol, manitol, dulcitol, etc., with a dehydrating agent to form the corresponding hexitan, i.e., sorbitan, mannitan, dulcitan, etc. The hexitan is then partially esterified with a long chain fatty acid, having between about eight and about 22 carbon atoms, such as dodecanoic acid, pentadecanoic acid, hexadecanoic acid, oleic acid, stearic acid, etc., to replace one of the reactive hydrogens of the hexitan with the carboxylic radical. The resultant partial ester is then reacted with ethylene oxide. Commercially available compounds of this type are "Tween 65" and "Tween 81" of The Atlas Powder Company.

As previously mentioned, however, the preferred class of surfactants include those which have already been approved by the E.P.A. for use in foods. Examples of suitable surfactants within this class comprise propylene glycol and the monosodium, diacetyl tartaric acid esters of the mono- and di- glycerides of edible fats or oils or edible fat-forming acids, methyl esters of higher fatty acids such as docosahexanoic, eicosapentanoic, linoleic, myristic, oleic, palmitic, palmitoleic or stearic acids, sorbitan monooleate or the polyoxyethylene derivative thereof. Examples of suitable edible oils or fats from which the diglycerides or fatty acids can be obtained include olive oil, peach kernel oil, pumpkin seed oil, sesame oil, almons oil, beechnut oil, castor oil, cod liver oil, maze oil, hazelnut oil, coconut oil, peanut oil, soya bean oil, cottonseed oil, tallow, sperm oil, seal oil, etc. Examples of various edible fatty acids include the fatty acids which can be obtained from such oils or synthetic fatty acids having from about eight to about 25 carbons. Examples of these fatty carboxylic carboxylic acids include caprylic, perlargonic, lindicylic, lauric, tridecylic, maristic, pentadecylic, palmitic, glutaric, capric, stearic, nondecylic, archtic, medulic, benhenic, carnubic, oleic, linoleic, myristoleic, palmitoleic, dodecenoic, pentadecenoic, linolinic, etc. Of the aforementioned, the fatty acids most commonly found in the animal and vegetable edible oils include oleic, linoleic, linolinic, stearic, palmitic and myristic.

In the practice of the invention, the solid fat, which can contain up to about 10 weight percent of liquid fat that is admixed therewith but which does not appreciably decrease the melting point of the fat below about 100°F., is heated to a temperature of about 100°–200°F. to melt the fat. The requisite amount of surfactant to effect the emulsification is added to the fat and the resultant mixture is stirred to obtain complete blending. Water, as such, or as molasses or aqueous solutions of urea, phosphoric acid, etc., should not be added or present during the step of preparing the fat-surfactant preblend. It has been found that the presence of water or an aqueous medium such as molasses during this blending of fat and surfactant will prevent the formation of a liquid product.

Thereafter, the fat-surfactant blend is admixed with the molasses medium. This admixing is performed under sufficient agitation to emulsify or disperse the molten fat thoroughly into the molasses medium and can be performed by use of a Lightnin mixer or other suitable mixing means. The mixing is performed at a temperature from about 80° to about 120°F. and, when necessary, the molasses medium can be preheated to the necessary temperatures to maintain the aforementioned blending temperatures during the mixing step. Upon completion of the mixing which can be performed in a period of time from about 10 to about 60 minutes, the resulting emulsion is removed from the blending tanks, cooled and passed to storage.

The amount of fat in the fat-surfactant blend which is to be blended with the molasses medium is at least about 15 weight percent, preferably from about 20 to 40 weight percent and, most preferably, from about 20 to about 25 weight percent of the final feed supplement. It has been found that this manner of mixing the preblended mixture of molten fat and surfactant with the molasses will permit the incorporation of the large amounts of fat desired in the feed supplements.

The viscosity of the feed supplement should be less than about 3,000 centipoises when measured at 70°F., preferably less than about 1,500 centipoises and most preferably less than about 1,000 centipoises. This insures that the material can be stored and handled as a liquid throughout the ambient temperatures expected to be encountered in the use of the feed supplement. Preferably, the minimal viscosities which can be attained are desired and varied amounts of water can be incorporated in the feed supplement to control the viscosity. In general, the maximum amount of water which should be added to the feed supplement is about 15 weight percent and, in interests of economical shipment and handling, it is desired that the water content not exceed about 10 weight percent.

The water can be introduced into the blending step during or after the blending of the fat with the molasses medium.

If desired, the water can also be pre-blended with the molasses medium in the requisite amount to achieve the desired viscosity of the supplement. The actual amount of water necessary for any combination of specific fats and molasses can be readily determined by pre-mixing a small amount of the fat-surfactant blend and the molasses, measuring the viscosity in the customary method and then adding incremental amounts of water until the desired viscosity is achieved.

The preferred animal feed supplements can also contain a stabilizing agent which is a hydrocolloid that is capable of stabilizing the emulsion and preventing its separation during prolonged storage, severe temperature conditions, as well as repeated freeze-thaw cycling. A wide variety of hydrocolloids are available which can be used. Since the product is a feed supplement, it is preferred to employ the stabilizing agent which have been previously registered as a safe food additive by the E.P.A. This, however, does not foreclose the use of other innocuous and harmless gums and hydrocolloids which could also be cleared upon the appropriate application and review by the E.P.A. Examples of the preferred class of hydrocolloids include gums such as acacia (gum arabic), agar agar, carob bean gum (locust bean gum), chondras extract (carragecnin), ghatti gum, guar gum, sterculia gum (karays gum) and tragacanth gum; and ammonium, sodium, potassium and calcium alginates. Other hydrocolloids which can be employed include the remaining alkali metal and alkaline earth metal alginates, e.g., lithium alginate, barium alginate, magnesium alginate, etc., the various glycol alginates such as propylene glycol alginate, ethylene glycol alginate, etc. and $C_1$–$C_5$ alkyl, alkyl ether and hydroxyalkyl cellulose derivatives such as hydroxyethyl cellulose, hydroxypropyl cellulose, carboxymethyl cellulose, carboxyethyl cellulose, methoxycellulose, ethoxycellulose, etc. Other gums include: xanthan gum, potato agar, malt agar, etc. The aforementioned hydrocolloids can be incorporated in the feed supplement at concentrations from 0.005 to about 0.25, preferably from 0.01 to about 0.1 weight percent, based on the weight of the feed supplement. The materials can be incorporated at any time during the preparation of the feed supplement or following its preparation. Preferably, the desired amount of the hydrocolloid is introduced into the blending step where the fat is blended and emulsified in the molasses medium. If desired, however, the hydrocolloid can be added to the molasses medium prior to its introduction into the blending step or the gum or hydrocolloid can be added to the feed supplement following the blending of the fat in the molasses medium.

The aforementioned amount of hydrocolloid can be employed in lieu of or in addition to the surfactants described herein. The combination of one or more of such surfactants and one or more hydrocolloids is preferred but not essential to the invention. As will be apparent from the examples herein, stable emulsions can also be obtained using only the hydrocolloids in the amounts described herein.

It is also desirable to incorporate a source of nitrogen in the feed supplement to furnish the nitrogen necessary for protein formation by the animal. The preferred source of nitrogen is urea which can be added as commercial crystalline urea or can be added as highly concentrated aqueous solutions of urea. Other nitrogen sources include mono- and/or di- ammonium polyphosphates, etc. The quantity of urea or ammonium phosphate which is employed in the composition can be from about eight to about 20 weight percent of the supplement.

The pH of the feed supplement should be adjusted to a slightly acidic value, e.g., in the range from about 3.5 to about 5.0, preferably from about 4.0 to about 4.75. This adjustment of the pH can be performed by the addition of phosphoric acid which also serves to supply soluble phosphorus to the animal. The amount of phosphoric acid which is added to the feed supplement will comprise from about 3.3 to about 5.0 weight percent of the feed supplement, preferably from about 3.3 to about 4.3 weight percent calculated as $H_3PO_4$. The phosphoric acid which is employed can be food grade orthophosphoric acid having from 75 to about 85 weight percent $H_3PO_4$ concentration. Polyphosphoric acids can be added if desired, however, at the elevated temperatures necessary for emulsification of the fat in the molasses medium or during the prolonged storage of the feed supplement, the polyphosphoric acids will undergo hydrolysis to the orthophosphoric acid. As previously mentioned, ammonium phosphates can also be used as an additive of the phosphorus and nitrogen and when an acidic phosphate such as monoammonium phosphate is furnished, this additive can also control the pH of the feed supplement in the desired range.

If desired, various trace nutrients and vitamins and various antioxidants for preservatives for such vitamins can also be incorporated. Thus, the feed composition can include vitamins A, C and E, tocopherols, as well as antioxidants therefor such as ethoxyquin(1,2-dihydro-6-ethoxy-2,2,4-trimethyl quinoline). Limited amounts of various additives can be used such as promazine hydrochloride which is a tranquillizer, chlormadinone acetate, diethylstilbesterol, oxytetracycline, coumaphos, melangestrol acetate, famphur. Bloat inhibitors such as poloxaline can also be incorporated in the feed supplement. The quantity and concentration of these materials which can be incorporated in the feed supplement are preferably in accordance with the established E.P.A. registrations to avoid the necessity for separate registration. If desired, however, other additives and/or dosages can be used and suitable steps can be taken to obtain registration of the new uses or different concentrations or dosages of these materials.

The following examples will serve to illustrate a mode of practice of the invention and to demonstrate results obtainable thereby:

EXAMPLE 1

A series of experiments are performed to demonstrate the incorporation of solid fat in a molasses medium using various surfactants. In these experiments, 50 grams of solid tallow and 1–4 grams of the selected surfactant are placed in a 400 milliliter beaker and heated to 170°F. to melt the fat. No water or molasses is added in this step. The heated mixture is stirred until a homogeneous blend is obtained and the beaker contents are then transferred to another beaker containing 120 to 130 grams of a molasses medium and 27 to 30 grams of water. The molasses medium and water mixture is at ambient temperature and the admixture of the molten fat and molasses medium is stirred with a Lightnin mixer while permitting the resultant mixture to cool to room temperature. This period is for approximately 15 minutes. Thereafter the feed supplement emulsion is sampled and the sample is tested for viscosity using a Brookfield viscosimeter. The feed supplement emulsion is then stored and found to be stable for storage periods of one to several weeks.

The experiments employed the following surfactants and yielded emulsions having the indicated viscosities:

Table 1

| Experiment | Surfactant | Viscosity, Centipoise |
|---|---|---|
| 1 | POE(20) Sorbitan Monooleate | 500 |
| 2 | POE(20) Sorbitan Monostearate | 980 |
| 3 | Diglycerol Monooleate | 2320 |
| 4 | Polyethylene glycol(400) Sesquioleate | 1180 |
| 5 | Polyethylene glycol(400) Monooleate | 3260 |
| 6 | 50% POE(20) Sorbitan Monooleate 50% Sorbitan Monooleate | 962 |
| 7 | 50% POE(20) Sorbitan Monostearate 50% Sorbitan Monostearate | 1640 |

EXAMPLE 2

The following experiments will illustrate the incorporation of a stabilizing amount of a hydrocolloid in the feed supplement and demonstrate the results achievable thereby.

In these experiments, 50 grams of the solid tallow is heated to 170°F. and the molten fat is slowly poured into a quantity of 140 grams of a molasses feed supplement containing 10 grams of an aqueous solution of the gums indicated in the following table at a concentration sufficient to impart to the final composition a concentration of 0.025 weight percent of the gum. The molasses supplement solution is at 80°F. and is stirred with a Lightnin mixer as the molten fat is added. The stirring is continued for 15 minutes after the addition of the fat during which time the temperature of the resultant blend slowly cools back to 80°F. Upon completion of the stirring and cooling period, the resultant emulsions are removed, sampled, and sample tested for viscosity. The products are stored for prolonged periods, e.g., about 3 weeks during which they are stable against separation.

The experiments included the following stabilizing additives which yielded feed supplements having the indicated viscosities:

Table 2

| Experiment | Additive | Viscosity at 70°F. |
|---|---|---|
| 8 | hydroxyethyl cellulose | 1438 |
| 9 | xanthan gum | 2960 |
| 10 | potato agar | 1080 |
| 11 | malt agar | 1124 |
| 12 | sodium alginate | 1282 |
| 13 | carboxymethyl cellulose | 1120 |
| 14 | methoxy cellulose | 1402 |
| 15 | propylene glycol alginate | 2900 |
| 16 | gum tragacanth | 1780 |
| 17 | gum arabic | 2440 |
| 18 | guar gum | 6000 |
| 19 | locust bean gum | 3160 |

EXAMPLE 3

In the following examples, the procedure of Example 2 is repeated, however, a mixture of a gum and a surfactant is used. The surfactant is sorbitan monooleate and is used at a sufficient concentration in an aqueous solution to impart to the final composition a surfactant content of 0.05 weight percent. Each aqueous solution also contains a gum as indicated in the following table at a concentration sufficient to impart to the final composition a gum content of 0.025 weight percent. The following table summarizes the results:

Table 3

| Experiment | Additive Gum | Viscosity at 70°F. |
|---|---|---|
| 20 | potato agar | 1280 |
| 21 | malt agar | 1240 |
| 22 | sodium alginate | 1680 |
| 23 | carboxymethyl cellulose | 1160 |
| 24 | methoxy cellulose | 1480 |

A comparison of the viscosities of the compositions from the aforedescribed experiments to the viscosities of compositions containing the same amount of identity of gums, Experiments 10, 11, 12, 13 and 14, reveals that the surfactant slightly increased the compositions' viscosity, from 3.6 to about 31 percent. This increase is modest and does not render the compositions unsuited for their intended use as a feed supplement. The compositions which also include a surfactant are extremely stable and possess an apparently indefinite shelf life; the compositions remaining stable even after over four weeks of storage.

EXAMPLE 4

The deleterious effect of water present in the step of blending of the surfactant and fat can be seen in the following experiments. Portions of the solid tallow which had been the source of fat in Example 1 were heated to 170°F. to melt the tallow and then blended in the following proportions with water and surfactants:

are set forth as compositions 3 and 4 in Table 4.

Another set of experiments was performed using a preblend of 50 grams of the fat and 1 gram of polyethylene glycol(400) sesquioleate prepared as in the preceding experiments. Varied amounts of the molasses supplement and water were admixed with the resultant preblends and the fat emulsion products obtained are set forth as compositions 5–7 in Table 4.

Experiments were also performed in which the fat content in the final product was varied from 15 to 25 percent, inversely to the content of the molasses supplement and at varied water contents. The preblend of fat and polyethylene glycol(400) sesquioleate was prepared as in the preceding experiments. The fat products obtained are described as compositions 8–13 in Table 4.

TABLE 4

| Composition | Emulsifier | % Emul. | % Fat | % Molasses | % $H_2O$ | Remarks[1] |
|---|---|---|---|---|---|---|
| 1 | POE(20) sorbitan monooleate | 0.5 | 26.5 | 58 | 15 | S.S. |
| 2 | Polyethylene glycol(400) monooleate | 0.5 | 26.5 | 58 | 15 | S.S. |
| 3 | POE(20) sorbitan monooleate | 0.5 | 25 | 59.5 | 15 | L.(710) |
| 4 | Polyethylene glycol(400) monooleate | 0.5 | 25 | 59.5 | 15 | L.(1190) |
| 5 | Polyethylene glycol(400) Sesquioleate | 0.5 | 25 | 69.5 | 5 | L.(2790) |
| 6 | " | 0.5 | 25 | 64.5 | 10 | L.(1180) |
| 7 | " | 0.5 | 25 | 59.5 | 15 | L.(590) |
| 8 | POE(20) sorbitan monooleate | 0.5 | 25 | 59.5 | 15 | L.(500) |
| 9 | " | 0.5 | 20 | 64.5 | 15 | L.(400) |
| 10 | " | 0.5 | 15 | 69.5 | 15 | L.(340) |
| 11 | " | 0.5 | 25 | 54.5 | 20 | L.(320) |
| 12 | " | 0.5 | 20 | 59.5 | 20 | L.(300) |
| 13 | " | 0.5 | 15 | 64.5 | 20 | L.(260) |

[1]S.S. = semi-solid; L = liquid, viscosities of liquid products are reported in centipoises at room temperature.

| Pre-emulsion A | |
|---|---|
| Molten fat | 139 grams |
| water | 78.6 |
| POE(20) sorbitan monooleate | 2.4 |
| Pre-emulsion B | |
| Molten fat | 139 grams |
| water | 78.6 |
| Polyethylene glycol (400) monooleate | 2.4 |

Aliquot portions of the pre-emulsions were blended with varied amounts of a molasses-containing feed supplement. The feed supplement composition was as follows:

| Molasses | 70% |
|---|---|
| 60% urea solution | 20 |
| 75% $H_3PO_4$ | 6 |
| Vitamins and minerals | 4 |

The fat pre-emulsion and molasses supplement were admixed in weight proportions of 42/58, respectively, to obtain the fat emulsion products set forth as compositions 1 and 2 in Table 4.

Additional experiments were performed in which 50-gram samples of the same tallow were preblended at 120°F. with one gram of the following surfactants:
POE(20) sorbitan monooleate
Polyethylene glycol(400) monooleate
Aliquot portions of the aforedescribed molasses supplement and of water were thereafter added to the preblend of fat and surfactant and the resulting mixture was stirred for 15 minutes, cooled to room temperature and its viscosity, if liquid, was determined. The results The preceding results reveal that the presence of water during the blending of the fat and surfactant yields products that are semi-solid upon admixture with molasses; Compositions 1 and 2. In contrast, use of the same proportions of ingredients with the water addition delayed until after the surfactant and fat are blended produced liquid products having low viscosities; Compositions 3 and 4. The results also indicate that the method is applicable for a range of fat contents from 15 to 25 percent.

The preceding examples are intended solely to illustrate a mode of practice of the invention. It is not intended that the invention be unduly limited thereby, but rather, it is intended that the invention be defined by the steps, materials and their obvious equivalents set forth in the following claims.

I claim:

1. The method of producing a liquid, stable, aqueous emulsion of solid fat and molasses containing at least about 15 weight percent fat including the steps of (1) melting said fat by heating it to a temperature above its melting point and within the range of about 100° to about 200°F., (2) admixing an oil-in-water surface active agent with the resultant molten fat in the absence of water and in an amount sufficient to provide a concentration of from 0.01 to about 0.5 weight percent of said surface active agent in said fat, (3) thereafter blending the resultant mixture of molten fat and surface active agent into molasses having a concentration of from 70 to about 85 Brix, and (4) adding to the resultant combination an amount of water corresponding to 15 weight percent or less of the total weight of said emulsion and sufficient to obtain said liquid emulsion having a viscosity less than about 3000 centipoises at 70°F.

2. The method of claim 1 wherein said molasses medium also contains from 8 to about 20 weight percent urea or biuret based on the total weight of said emulsion blend.

3. The method of claim 1 further comprising the step of combining with said fat, molasses, water and surface active agent an amount of a component selected from the group consisting of phosphoric acid and monoammonium orthophosphate sufficient to adjust the pH of said emulsion to a level within the range of about 3.5 to about 5.0.

4. The method of claim 1 further comprising the step of adding to said emulsion about 0.005 to about 0.25 weight percent, based on the total weight of the emulsion, of a member selected from the group consisting of edible gums and alkyl cellulose.

5. The method of claim 1 wherein said solid fat is admixed in an amount sufficient to prepare an emulsion containing from 20 to 40 weight percent of said fat.

6. The method of claim 5 wherein the viscosity of the liquid emulsion is less than about 1,000 centipoises when measured at 70°F.

7. The method of claim 5 further comprising the step of combining with said fat, molasses, water and surface active agent a member selected from the group consisting of phosphoric acid and monoammonium orthophosphate in an amount sufficient to adjust the pH of said emulsion to a level within the range of about 4.0 to about 4.75.

8. The method of claim 7 wherein the molasses has a concentration of from 80 to 85 Brix.

9. The method of claim 5 further comprising the step of combining with said fat, molasses, water and surface active agent about 0.005 to about 0.25 weight percent, based on the final emulsion, of a member selected from the group consisting of edible gums and alkyl cellulose.

* * * * *